United States Patent
Schröder

(10) Patent No.: US 9,482,194 B2
(45) Date of Patent: Nov. 1, 2016

(54) MIXING VALVE FOR AN INTERNAL COMBUSTION ENGINE OF A MOTOR VEHICLE

(71) Applicant: CONTINENTAL AUTOMOTIVE GMBH, Hannover (DE)

(72) Inventor: Lothar Schröder, Karben (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 14/390,318

(22) PCT Filed: Mar. 26, 2013

(86) PCT No.: PCT/EP2013/056438
§ 371 (c)(1),
(2) Date: Oct. 2, 2014

(87) PCT Pub. No.: WO2013/149896
PCT Pub. Date: Oct. 10, 2013

(65) Prior Publication Data
US 2015/0176548 A1     Jun. 25, 2015

(30) Foreign Application Priority Data
Apr. 5, 2012 (DE) .................. 10 2012 205 691

(51) Int. Cl.
| F02M 35/10 | (2006.01) |
| F02M 25/07 | (2006.01) |
| F16K 11/052 | (2006.01) |
| F16K 11/16 | (2006.01) |

(52) U.S. Cl.
CPC ....... *F02M 35/10255* (2013.01); *F02M 26/21* (2016.02); *F02M 26/64* (2016.02); *F02M 26/70* (2016.02); *F16K 11/0525* (2013.01); *F16K 11/165* (2013.01)

(58) Field of Classification Search
CPC ............... F02M 25/0793; F02M 25/0786; F02M 25/07; F02M 25/0719; F02M 25/0724; F02M 25/0792; F02M 25/0796; F02M 25/0718; F02M 35/10255; F16K 11/0525; F16K 11/165
USPC ....... 123/190.2, 190.17, 190.1, 188.1, 90.23, 123/568.11–568.26
See application file for complete search history.

(56) References Cited

U.S. PATENT DOCUMENTS

| 3,399,657 A * | 9/1968 | Claude ............... F02P 5/00 123/146.5 A |
| 7,566,046 B2 * | 7/2009 | Muhr ................ F01L 3/10 123/188.13 |
| 7,712,449 B1 * | 5/2010 | Schwoerer ........... F01L 1/08 123/321 |
| 2010/0206274 A1 * | 8/2010 | Furukawa ............ F16K 35/14 123/568.11 |
| 2011/0023846 A1 | 2/2011 | Miyazaki et al. |
| 2012/0145134 A1 * | 6/2012 | Miyazaki ........... F02D 9/1065 123/568.2 |

(Continued)

FOREIGN PATENT DOCUMENTS

| CN | 1661218 | 8/2005 |
| DE | 2515194 A1 | 10/1976 |

(Continued)

*Primary Examiner* — Lindsay Low
*Assistant Examiner* — Long T Tran
(74) *Attorney, Agent, or Firm* — Cozen O'Connor

(57) ABSTRACT

In a mixing valve for an internal combustion engine of a motor vehicle, the distance between pivot axes of two flaps is smaller than the diameter of the largest flap. The flaps are also connected to a single drive device. The drive device ensures a collision-free coupling of the movements of the flaps.

8 Claims, 3 Drawing Sheets

(56) References Cited

U.S. PATENT DOCUMENTS

| | | | | |
|---|---|---|---|---|
| 2013/0025576 A1* | 1/2013 | Busato | ............... | F02M 26/16 123/568.11 |
| 2013/0047967 A1* | 2/2013 | Hodebourg | ............ | F16K 11/22 123/568.15 |
| 2013/0047968 A1* | 2/2013 | Hodebourg | ............ | F16K 11/22 123/568.15 |
| 2013/0285590 A1* | 10/2013 | Sato | ............... | F01L 13/0026 318/626 |

FOREIGN PATENT DOCUMENTS

| | | |
|---|---|---|
| DE | 10 2004 042 662 B3 | 2/2006 |
| DE | 10 2010 032 824 A1 | 2/2011 |
| FR | 218 5764 A1 | 1/1974 |
| FR | 2926114 | 7/2009 |
| GB | 1418 058 A | 12/1975 |
| JP | S 5587848 A | 7/1980 |
| JP | 2010196570 A | 9/2010 |
| WO | WO2011130015 A2 | 10/2011 |

* cited by examiner

18

MIXING VALVE FOR AN INTERNAL COMBUSTION ENGINE OF A MOTOR VEHICLE

CROSS-REFERENCE TO RELATED APPLICATIONS

This is a U.S. national stage of application No. PCT/EP2013/056438, filed on 26 Mar. 2013, which claims priority to the German Application No. DE 102012205691.2 filed 5 Apr. 2012, the content of both incorporated herein by reference.

BACKGROUND OF THE INVENTION

1. Field of the Invention

The invention relates to a mixing valve of an internal combustion engine of a motor vehicle, having a flap arranged in an intake duct and having a flap arranged in an exhaust-gas recirculation duct, wherein the intake duct and the exhaust-gas recirculation duct issue into a common collecting duct, and having a drive device for driving the flaps.

2. Related Art

Mixing valves of this type are commonly used in exhaust-gas recirculation systems of internal combustion engines of modern motor vehicles, and are known from practice. The movements of the intake flap and of the exhaust flap are controlled such that the exhaust flap, proceeding from the first position, opens linearly with an actuation signal of the drive device. The intake flap however initially pauses in the first position and is closed only above a designated actuation signal.

The flaps of the known mixing valves have a spacing corresponding at least to the diameter of the larger of the flaps. A collision of the flaps is prevented in this way. The different drives of the flaps require a large structural space, which is, however, often not available.

SUMMARY OF THE INVENTION

An object of the invention is to solve the problem of designing a mixing valve of the type mentioned above so as to have a particularly small structural space.

This problem may be solved according to the invention in that the spacing between pivot axes of the flaps is smaller than the diameter of the largest flap, and in that pivoting movements of the flaps are coupled in a collision-free manner.

By this design, the coupling of the pivoting movements of the flaps ensures that the flaps, despite overlap of their pivoting movements, do not collide with one another. It is thus possible for the pivot axes of the flaps to be arranged particularly close together. At the same time, in this way, the structure for driving the flaps are likewise arranged close together. The mixing valve thus has a particularly small structural space.

In one advantageous refinement of the invention, the collision-free guidance of the flaps is realized in a particularly simple manner if the flaps are guided in the same direction.

In another advantageous refinement of the invention, the structural outlay for driving the flaps can be kept particularly low if the drive device has a single electric motor, and if the electric motor is connected to the flaps via respective positioning structures. In this way, it is possible for the mixing valve to fully replace two individual valves. Owing to the invention, numerous components, such as housings, covers, sensors and plug connectors for the electric motor, are required only singly. The mixing valve according to the invention thus offers not only the structural space advantage but also a great cost advantage.

In another advantageous refinement of the invention, the electric motor may have an electric motor with particularly small dimensions if at least one of the positioning structures has a gearwheel mechanism with multiple gearwheels. Such electric motors normally have a high rotational speed. The gearwheel mechanism makes it possible for the high rotational speed of the electric motor to be converted to the intended pivoting movements of the flaps.

In another advantageous refinement of the invention, the movement sequence of the flaps can be controlled in a simple manner if a coupling is arranged between one positioning structures and the flap.

In another advantageous refinement of the invention, the coupling is of particularly simple structural design if the coupling is a claw-type coupling with lost motion.

In another advantageous refinement of the invention, the movement sequence and the movement speed of the flaps can be made particularly versatile if at least one of the positioning structures has a control cam for the guidance of a control part.

In another advantageous refinement of the invention, the control cam and the control part are of particularly simple design if the control cam is arranged on the outer contour of a driven wheel and if the control part is a roller that is connected to one of the flaps and that rolls on the control cam. The flap is preferably resiliently elastically preloaded by way of a wheel against the outer contour. In particular, the combination of the drive of one flap by the control cam and of the other flap by the gearwheel mechanism makes it possible to realize the particularly small dimensions of the mixing valve.

In another advantageous refinement of the invention, the number of bearing points can be kept particularly low if the wheel that has the control can is arranged on a gearwheel of the gearwheel mechanism. This contributes to a further reduction of the dimensions of the mixing valve.

In another advantageous refinement of the invention, the gases flowing in the intake duct and in the exhaust-gas recirculation duct can be mixed in any desired manner if, in a central position of the drive device, both flaps are open, and in the end positions, one or the other of the flaps is closed.

BRIEF DESCRIPTION OF THE DRAWINGS

The invention encompasses numerous embodiments. To further illustrate its basic principle, one of these embodiments is illustrated in the drawings and will be described below. In the drawings.

DETAILED DESCRIPTION OF THE PRESENTLY PREFERRED EMBODIMENTS

Figure 1:
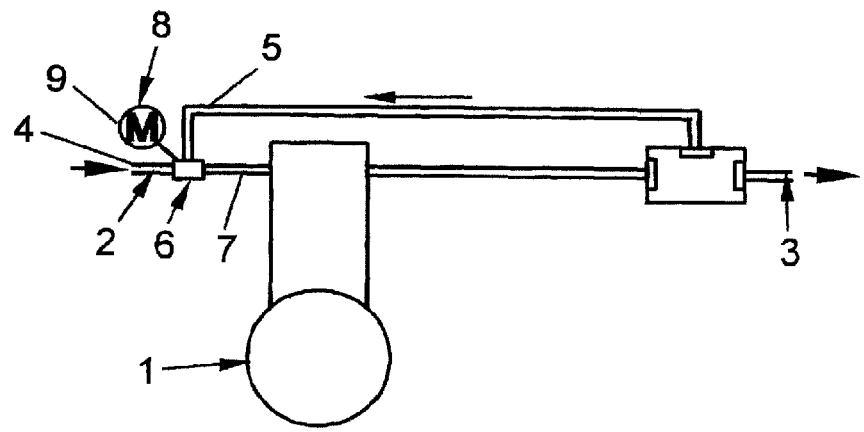
FIG. 1 shows an internal combustion engine having a mixing valve according to the invention.

FIG. 1 schematically shows an internal combustion engine 1 having an intake line 2 and having an exhaust line 3. The intake line 2 has an intake duct 4 via which air is drawn in from the environment. From the exhaust line 3, an exhaust gas recirculation duct 5 leads via a mixing valve 6 into the intake line 2. The mixing valve 6 merges the intake duct 4 and the exhaust-gas recirculation duct 5 to form a collecting duct 7. The collecting duct 7 leads directly to the internal combustion engine 1. A drive device 8 having an electric motor 9 permits an adjustment of the mixing valve 6.

Figure 2:
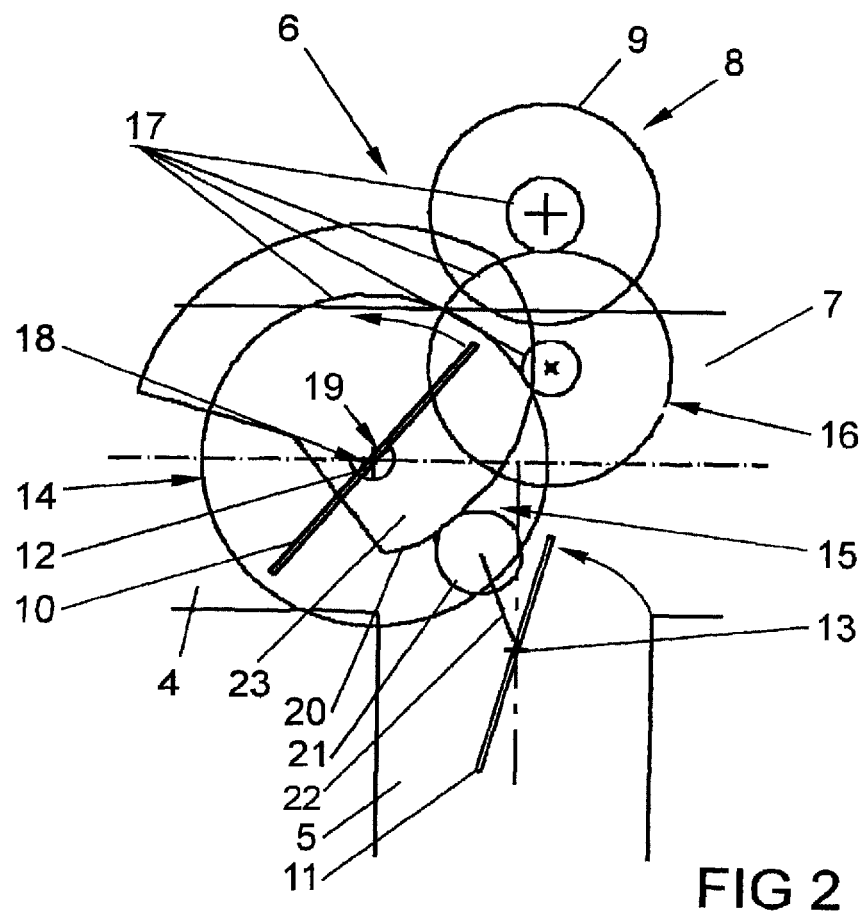
FIG. 2 schematically shows the mixing valve from FIG. 1.

FIG. 2 shows the mixing valve 6 from FIG. 1 with the drive device 8. For simplicity, the drive device 8 is illustrated schematically. The mixing valve 6 has a pivotable flap 10 arranged in the intake duct 4 and a pivotable flap 11 arranged in the exhaust-gas recirculation duct 5. The flap 10 arranged in the intake duct 4 is slightly larger than the flap 11 arranged in the exhaust-gas recirculation duct 5. The spacing of pivot axes 12, 13 of the flaps 10, 11 amounts to approximately 80% of the diameter of the larger flap 10, which is arranged in the intake duct 4.

Figure 4:
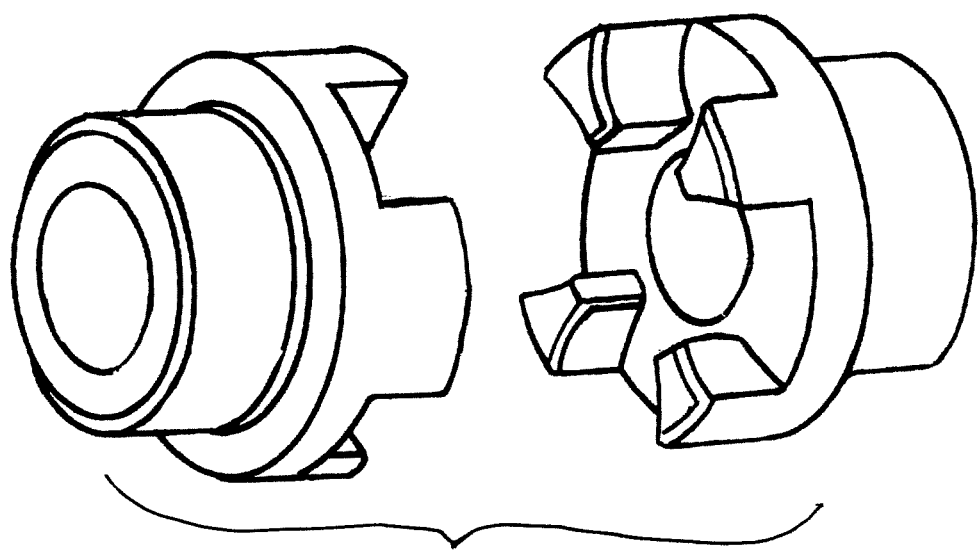
FIG. 4 is a schematic view of a claw-type coupling.

The flaps 10, 11 are driven by the single electric motor 9. The flaps 10, 11 are pivoted in the same direction, as indicated in the drawing by arrows. For this purpose, the drive device 8 has a first positioning structure 14 leading to the flap 10 arranged in the intake duct 4, and has a second positioning structure 15 leading to the flap 11 arranged in the exhaust-gas recirculation duct 5. The positioning structure 14 leading to the flap 10 arranged in the intake duct 4 has a gearwheel mechanism 16 with multiple gearwheels 17 and a coupling 18. The coupling 18 has lost motion 19 through which the gearwheels 17 can be driven without the flap 10 being moved conjointly. In an embodiment, the coupling 18 is a claw-type coupling with lost motion 19. An example of such a claw-type coupling 18 is shown in FIG. 4.

The positioning structure 15 leading to the flap 11 arranged in the exhaust-gas recirculation duct 5 has a control cam 20 for the movement of a control part 21. The control part 21 is connected via a lever 22, to the flap 11 arranged in the exhaust gas recirculation duct 5. The control cam 20 is arranged on the outer contour of a wheel 23 that is driven by the gearwheel mechanism 16. The control part 21 is in the form of a roller that rolls on the outer contour.

The two flaps 10, 11 are biased into the open position by spring elements (not illustrated). The drive device 8 thus drives the flaps 10, 11 in the closing direction.

Figure 3:
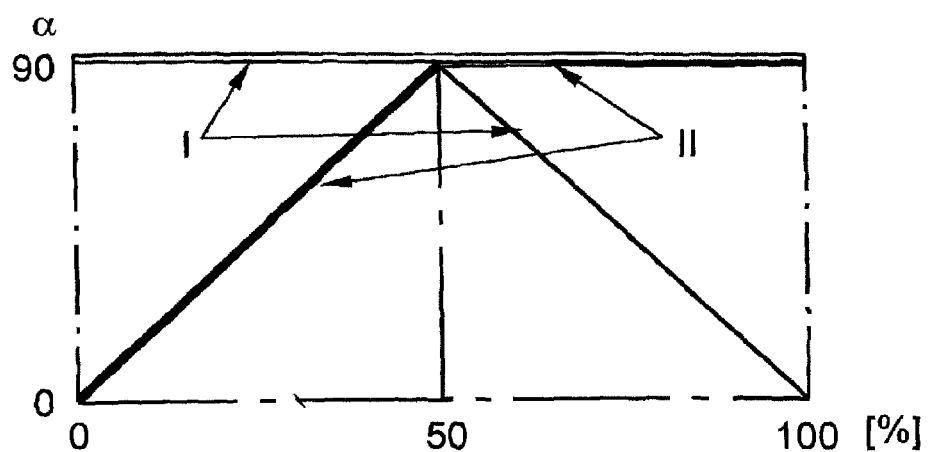
FIG. 3 schematically shows pivoting movements of flaps of the mixing valve from FIG. 2.

FIG. 3 shows the opening angle α of the flaps 10, 11 over a range of movement of the gearwheel mechanism 16. The movement of the flap 10 arranged in the intake duct 4 is denoted by I and the movement of the flap 11 arranged in the exhaust-gas recirculation duct 5 is denoted by II. For simplicity, the range of movement is illustrated in percentage values. Here, it can be seen that, in an initial state of 0% of the range of movement, the flap 10 of the intake duct 4 is fully open, whereas the flap 11 of the exhaust-gas recirculation duct 5 is fully closed. When the gearwheel mechanism 16 is driven to 50% of the range of movement, both of the flaps 10, 11 are fully open. The flap 10 arranged in the intake duct 4 subsequently closes fully, where as the flap 11 arranged in the exhaust-gas recirculation duct 5 remains in the fully open position.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mixing valve (6) of an internal combustion engine (1) of a motor vehicle, comprising:
   an intake duct (4);
   an exhaust-gas recirculation duct (5);
   a first flap (10), having a first flap pivot axis (12), arranged in the intake duct (4);
   a second flap (11), having a second flap pivot axis (13), arranged in the exhaust-gas recirculation duct (5), wherein the intake duct (4) and the exhaust-gas recirculation duct (5) issue into a common collecting duct (7);
   a drive device (8) configured to drive the first and second flaps (10, 11), the drive device (8) having a single electric motor (9), the electric motor (9) being connected to the first and second flaps (10, 11) via respective positioning structures (14, 15); and
   a coupling (18) arranged between one positioning structure (14) and the first flap (10), the coupling (18) being arranged at the first flap pivot axis (12),
   wherein a spacing between the first flap pivot axis (12) and the second flap pivot axis (13) is smaller than a diameter of the first flap (10), and pivoting movements of the first and second flaps (10, 11) are coupled in a collision-free manner.

2. The mixing valve as claimed in claim 1, wherein the first and second flaps (10, 11) are guided in a common direction.

3. The mixing valve as claimed in claim 1, wherein at least one of the positioning structures (14) has a gearwheel mechanism (16) with multiple gearwheels (17).

4. The mixing valve as claimed in claim 1, wherein, in a central position of the drive device (8), both of the first and second flaps (10, 11) are open, and in end positions of the drive device (8), one or the other of the first and second flaps (10, 11) is closed.

5. A mixing valve (6) of an internal combustion engine (1) of a motor vehicle, comprising:
   an intake duct (4);
   an exhaust-gas recirculation duct (5);
   a first flap (10), having a first flap pivot axis (12), arranged in the intake duct (4);
   a second flap (11), having a second flap pivot axis (13), arranged in the exhaust-gas recirculation duct (5), wherein the intake duct (4) and the exhaust-gas recirculation duct (5) issue into a common collecting duct (7);
   a drive device (8) configured to drive the first and second flaps (10, 11), the drive device (8) having a single electric motor (9), the electric motor (9) being connected to the first and second flaps (10, 11) via respective positioning structures (14, 15); and
   a coupling (18) arranged between one positioning structure (14) and the first flap (10),
   wherein a spacing between the first flap pivot axis (12) and the second flap pivot axis (13) is smaller than a diameter of the first flap (10), and pivoting movements of the first and second flaps (10, 11) are coupled in a collision-free manner, wherein at least one of the positioning structures (14) has a gearwheel mechanism (16) with multiple gearwheels (17), and wherein the coupling (18) is a claw-type coupling with lost motion (19).

6. The mixing valve as claimed in claim 5, wherein at least one of the positioning structures (15) has a control cam (20) configured to guide a control part (21).

7. The mixing valve as claimed in claim 6, wherein the control cam (20) is arranged on an outer contour of a driven wheel (23), and the control part (21) is a roller connected to one of the first and second flaps (11) and rolls on the control cam (20).

8. The mixing valve as claimed in claim 7, wherein the wheel (23) having the control cam (20) is arranged on a gearwheel (17) of the gearwheel mechanism (16).

* * * * *